(12) United States Patent
Kim et al.

(10) Patent No.: US 7,169,250 B2
(45) Date of Patent: Jan. 30, 2007

(54) NANOFIBROUS ARTICLES

(75) Inventors: Gene Kim, Plantation, FL (US);
Bonnie J. Bachman, Davie, FL (US);
Stephen O. Bozzone, Lauderhill, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/899,966

(22) Filed: Jul. 27, 2004

(65) Prior Publication Data
US 2006/0024499 A1    Feb. 2, 2006

(51) Int. Cl.
*B29C 65/00*    (2006.01)
(52) U.S. Cl. ............ 156/290; 156/278; 156/321; 156/325; 156/296; 156/310; 428/401; 428/292.1; 204/164; 333/186; 333/197; 423/447.1
(58) Field of Classification Search ............... 333/186, 333/197, 133; 310/309; 205/768; 423/447.3, 423/447.1; 442/55; 73/105; 428/403, 401, 428/358, 359, 361, 364, 367; 156/278, 321, 156/325, 290, 296, 310
See application file for complete search history.

(56) References Cited

U.S. PATENT DOCUMENTS

| 5,214,095 | A | 5/1993 | Lavoie |
| 5,780,101 | A | 7/1998 | Nolan et al. |
| 5,965,267 | A | 10/1999 | Nolan et al. |
| 6,716,409 | B2 * | 4/2004 | Hafner et al. ............ 423/447.1 |
| 6,737,939 | B2 * | 5/2004 | Hoppe et al. ............... 333/186 |
| 2003/0041438 | A1 | 3/2003 | Wei et al. |

OTHER PUBLICATIONS

Wei, Yi, et al., "Stability of carbon nanotubes under electric field studied by scanning electron microscopy", Applied Physics Letters, vol. 79, No. 27; Dec. 31, 2001.

* cited by examiner

*Primary Examiner*—Merrick Dixon

(57) ABSTRACT

Nanofibrous articles can be manufactured by a process that includes preparation of a surface of a substrate to provide an adhesion mechanism for securing the nanofibers to the surface. The nanofibers can be dispersed in an area near the substrate for the purpose of being adhered to the surface. If an ordered arrangement of nanofibers is required, an electric field can be provided in the area where the nanofibers are dispersed to selectively control an ordering of the nanofibers as they are adhered to the surface by the adhesion mechanism.

16 Claims, 2 Drawing Sheets

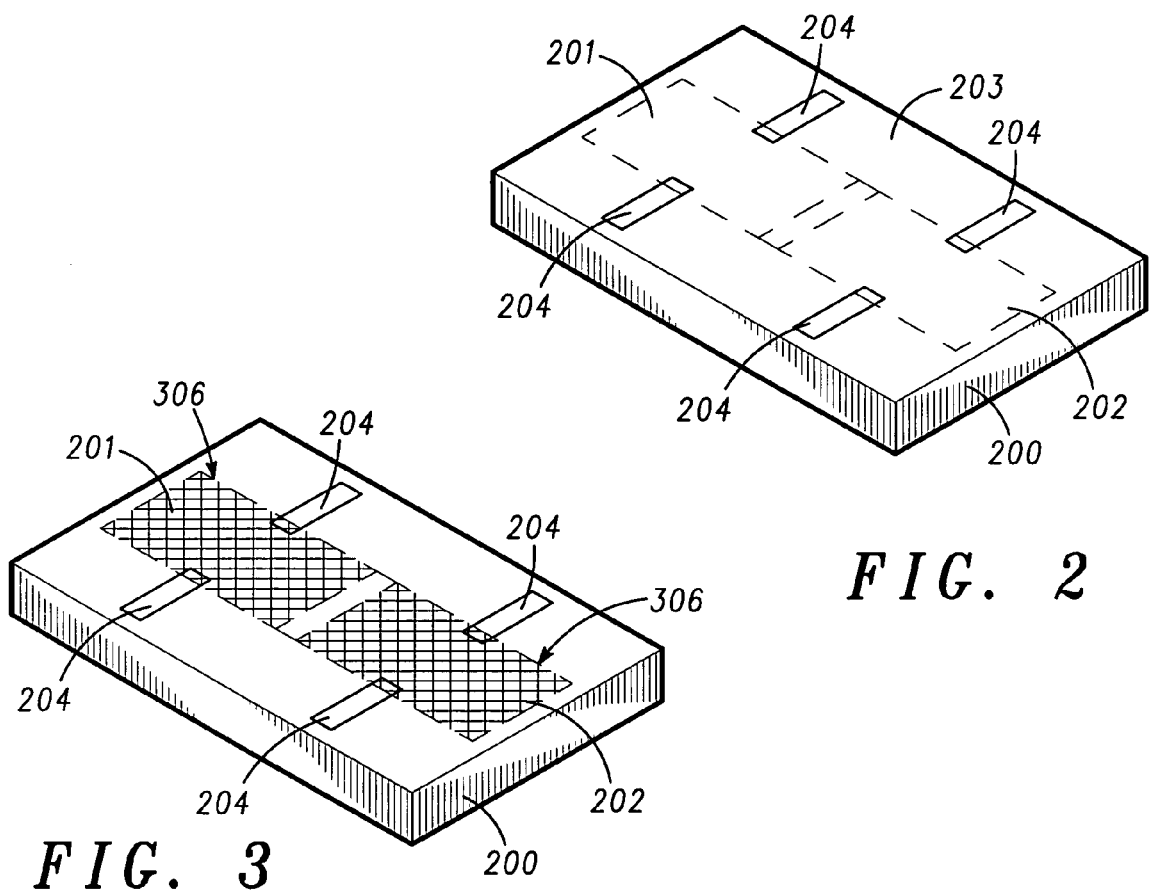
FIG. 2
FIG. 3
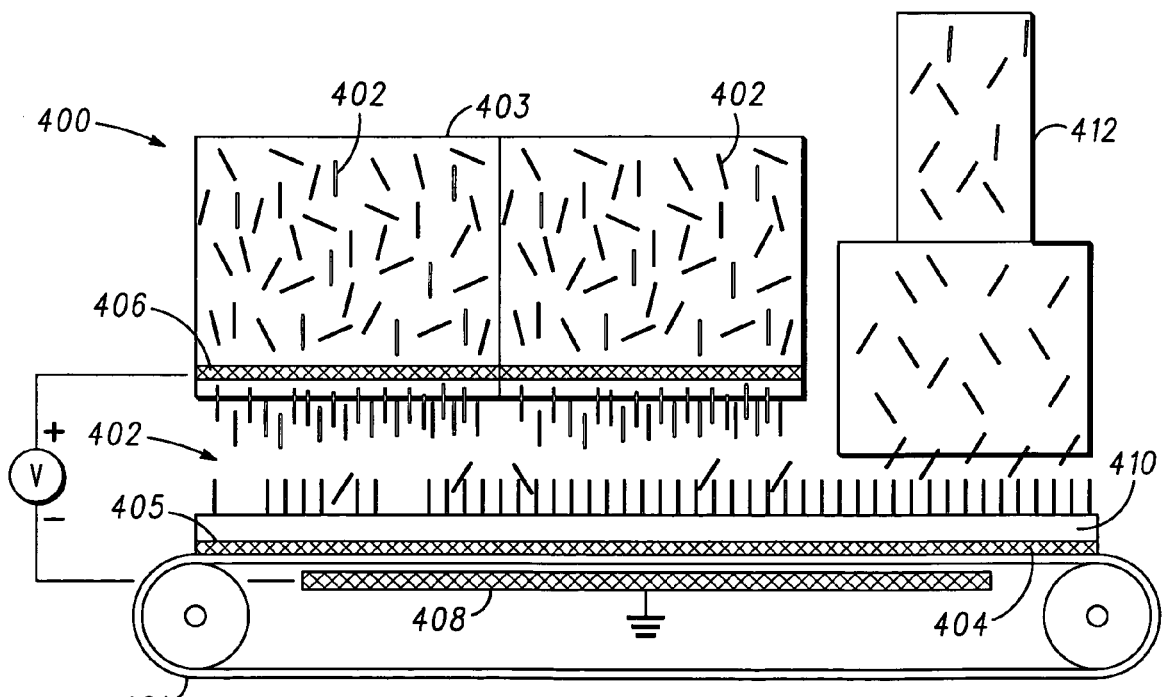
FIG. 4

NANOFIBROUS ARTICLES

BACKGROUND OF THE INVENTION

1. Field of the Invention

The present invention generally concerns nanofibers, and more particularly concerns articles which include nanofibers disposed thereon and methods of manufacturing the same.

2. Description of Related Art

Nanofibers include a variety of unique materials that are well known in the art. For example, these materials can include: carbon nanotubes (single, double, multiwall, and others), carbon nanohorns, silica nanotubes, alumina nanotubes, boron nitride nanotubes, carbon nanofibers, silica nanofibers, gold nanotubes, silver nanotubes, and polymer nanotubes.

One well known and particularly interesting type of nanofiber is the carbon nanotube. This material has very unique properties that no other carbonaceous species has. For example, the material exhibits good thermal and electrical conductivity and an ultrahigh modulus. These properties suggest that it will be the material of choice for a new generation of applications including sensors, displays, electronics, and so on. For example, the field-emitting characteristics of carbon-nanotube films have attracted serious interest in the display industry. Flat-panel displays manufactured from nanotubes are already known in the art. Existing research has also produced nanotube based transistor designs that may be competitive with state-of-the-art silicon devices. Research has also revealed that nanotubes could be used to store hydrogen fuel.

As the cost of commercially available bulk carbon nanotubes has dropped, there has been a growing interest in developing new applications for the material. Many applications in the electronics and display field require ordered arrangements of nanotubes that are uniformly aligned in accordance with the requirements of a particular design. However, the fabrication of these molecules into these types of useful structure still relies on expensive complex techniques and an immature infrastructure. To alleviate some of these issues, new manufacturing paradigms are needed.

Within the textile industry, there is a well known technique that is conventionally referred to as flocking. The majority of flocking performed worldwide uses finely cut natural or synthetic fibers, typically in the length range of 0.3~1.0 mm, with filament size ranging from 0.8~25.0 denier per filament (dpf). One denier is approximately 12 microns.

Flocking can be done with or without an electrostatic field. The manual or vibration method of flocking transfers fibers onto a substrate using gravity to deposit a layer of material onto a substrate, which is usually coated with an adhesive. The fibers deposited on the substrate using this technique are non-directional, usually lying flat on the substrate. Electrostatic flocking is the application of fibers or particles to adhesive coated surfaces, usually with the assistance of an electrostatic field established between two electrodes. An electrostatic charge is imparted to the fibers as they are introduced into the electric field, and the sample of interest to be coated with these fibrous materials is typically either connected to a ground electrode or is in front of a ground source. One advantage of electrostatic flocking is that the fibers can be uniformly aligned with the electric field. The electric field is typically perpendicular to the surface on which the fibers are disposed, although other orientations are also possible.

SUMMARY OF THE INVENTION

The invention concerns nanofibrous articles and a method for manufacturing same. The method involves an approach that is similar to the flocking technique used in the textile industry. The resulting article comprises a bed of nanofibrous materials attached to a susbstrate surface that can be of any dimension, shape or material. The fiber orientation can be perpendicular to the substrate surface, or any other ordered orientation that is desired.

The method for manufacturing the nanofibrous article can include several steps. The process can begin with the preparation of a surface of a substrate to provide an adhesion mechanism for adhering the nanofibers to the surface. The nanofibers can be dispersed in an area above or near the substrate for the purpose of being adhered to the surface. If an ordered arrangement of nanofibers is required, an electric field can be provided in the area where the fibers are dispersed to selectively control an ordering of the nanofibers as they are adhered to the surface by the adhesion mechanism.

Nanofibers can include a wide variety of very small filament-like structures such as carbon nanotubes, carbon nanohorns, alumina nanotubes, boron nitride nanotubes, carbon nanofibers, silica nanofibers, gold nanotubes, silver nanotubes, and polymer nanotubes. Still, a variety of other types of nanofibers are well known and the term nanofiber is not limited to the particular structures identified herein. Carbon nanotubes are typically only about 2 to 10 nanometers in thickness. However, nanofibers can include a wide range of fibrous materials that have a filament thickness of between about 1 nanometer and 500 nanometers. The length of the fibers can be in excess of 100 microns, depending on the application.

The adhesion mechanism referred to herein can include any alteration, addition to, or modification of the substrate that facilitates adhesion of the nanofibers to a surface of the substrate. For example, the adhesion mechanism can consist of a conductive or nonconductive adhesive material applied to the surface of the substrate prior to the dispersing step. Alternatively, the adhesion mechanism can also be a physical modification of a material forming the substrate, such as heating a thermoplastic substrate material in selected areas to cause adhesion of the nanofibers in such areas. Another alternative can include a combination of these techniques. For example, a relatively low melting point material such as solder can be applied to selected portions of the substrate. Thereafter, the substrate can be heated to soften the low melting point material to allow adhesion of the nanofibers thereto during the dispersion step.

The adhesion mechanism can be provided on selected areas of the surface so as to define one or more functional structures. One example of such a functional structure would include electronic circuit components such as conductive traces, antennas, electrical contacts, as well as passive and active circuit elements. Another example of a functional structure would be electro-optical devices such as field emission elements. Yet another such functional structure could include use of the nanofibers to form energy storage elements for hydrogen and other fuels.

The nanofibers can be disposed on the substrate surface in an ordered arrangement by selectively controlling the orientation of an electric field extending through or from the substrate surface. In general, the nanofibers will align with the electric field as they are disposed on the substrate. For example, if the electric field is oriented perpendicular to the substrate surface, the fibers will be disposed on the substrate in an ordered manner, and will also be perpendicular to the substrate surface. The nanofibers can have a functional coating applied to them before they are dispersed onto the substrate. The nanofibers can also be mixed with a dispersing agent prior to the dispersing step to promote dispersion. Further, it should be noted that the material forming the substrate can be chosen to be rigid, flexible, or conformable as may be required for a particular application.

The nanofibers dispersed on the substrate can include one or more nanofibers of different types. According to one aspect of the invention, specific types of the nanofibers can be dispersed exclusively within selected areas of the substrate. Alternatively, a mixture of nanofibers of different types can be dispersed together within selected common areas of the substrate. According to another aspect, the nanofibers dispersed on the substrate can include nanofibers having different coatings. Nanofibers having a particular coating can be dispersed exclusively within selected areas of said substrate. Alternatively, nanofibers having different coatings can be dispersed within the same areas of the substrate.

The invention can also include an ordered nanofibrous article. The article can be formed of a substrate having a conductive or nonconductive adhesive layer distinct from the substrate material and disposed on selected portions thereof. Nanofibers can be arranged on the selected portions of the substrate in an ordered manner, and adhered to the substrate by the adhesive layer. The nanofibers can be any of a wide range of nanofiber types. For example, the nanofibers can be carbon nanotubes, carbon nanohorns, alumina nanotubes, boron nitride nanotubes, carbon nanofibers, silica nanofibers, gold nanotubes, silver nanotubes, or polymer nanotubes. The nanofibers can be arranged on the substrate to define conductive traces, antennas, electrical contacts, field emission elements, energy storage elements, or electronic circuit elements.

BRIEF DESCRIPTION OF THE DRAWINGS

FIG. 2 is a perspective view of a substrate on which selected areas have been identified for application of nanofibers.

FIG. 3 is a perspective view of the substrate in FIG. 2 on which an adhesive mechanism has been provided.

FIG. 4 is a schematic representation of a nanofiber application system that can be used for manufacturing nanofibrous articles.

DETAILED DESCRIPTION

Figure 1:
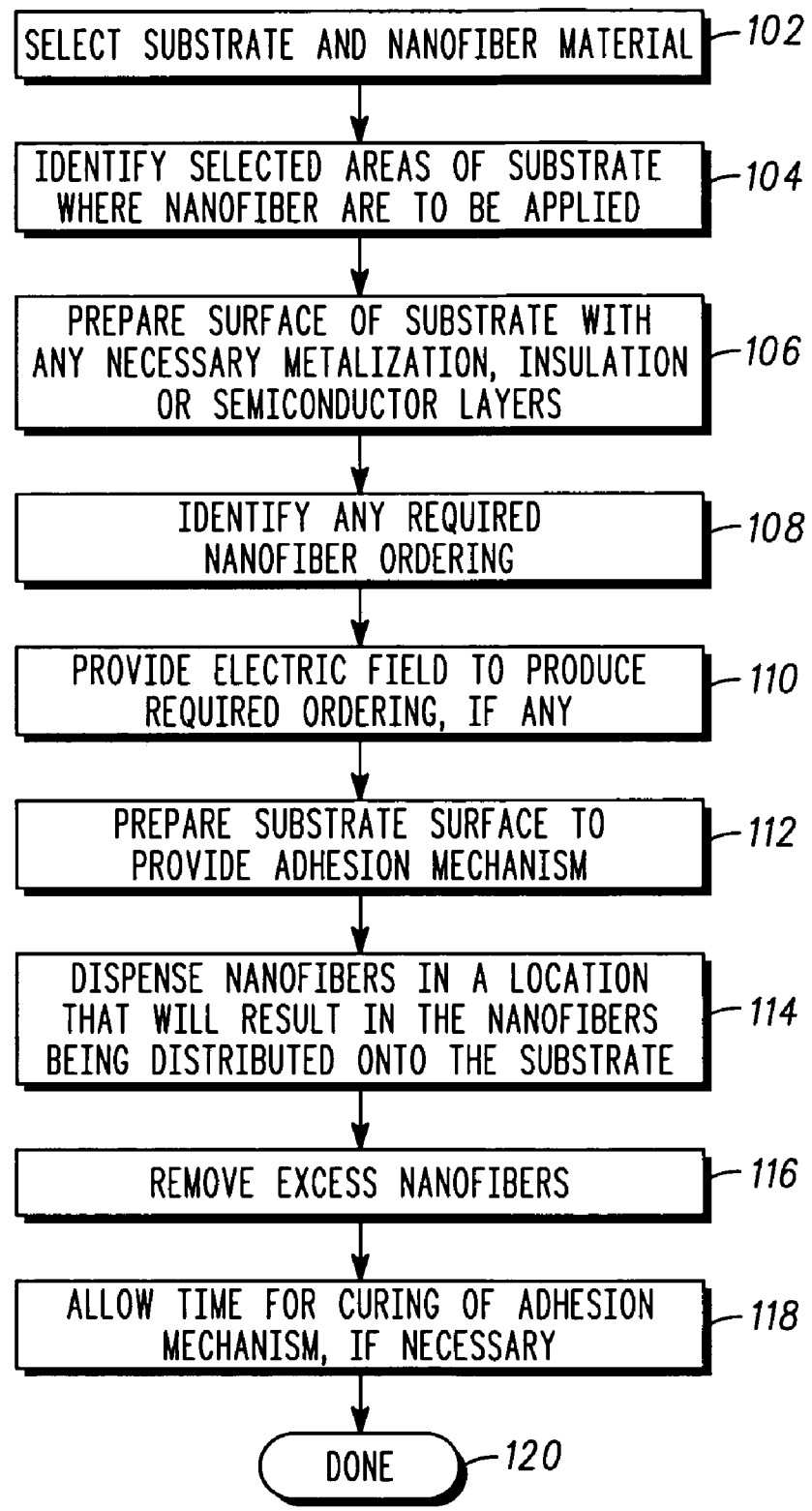
FIG. 1 is a flowchart that is useful for understanding a process for manufacturing nanofibrous articles.

The invention concerns nanofibrous articles and a method for manufacturing same. The method involves an approach that incorporates a flocking technique. The resulting article comprises a bed of nanofibrous materials attached to a susbstrate surface that can be of any dimension, shape or material. The fiber orientation can be perpendicular to the substrate surface, or any other ordered orientation that is desired.

A flowchart is shown in FIG. 1 that is useful for understanding the process. As illustrated therein, the process 100 can include several steps beginning with the selection of a substrate and a nanofiber material in step 102. The substrate and the nanofibers can be chosen to include any of a wide variety of materials suitable for a particular application. For example, the substrate can be formed of metal, polymer, plastic, thermoplastic, glass, glass-ceramic, low-temperature cofired ceramic, fiber composite and so on. Still, the invention is not limited to these substrate materials. Depending on the material selected, the substrate can be rigid, flexible or deformable, without limitation. Further, it should be understood the substrate is not limited to simple planar surfaces, but instead can include a wide variety of three-dimensional substrates with multiple surfaces at different orientations.

The term nanofiber as used herein shall be understood to mean any of a broad range of fibrous materials formed of very fine filaments having a filament thickness or diameter ranging from about 1 nanometer to about 500 nanometers. The length of the filaments is not critical and can vary depending on the particular application. In some instances, filament length can exceed 100 microns.

The particular choice of nanofiber type will depend on the specific application. For example nanofibers for use with the invention can include single and multi-wall carbon nanotubes, carbon nanohorns, alumina nanotubes, boron nitride nanotubes, carbon nanofibers, silica nanofibers, gold nanotubes, silver nanotubes, and polymer nanotubes. Still, it will be readily appreciated that the invention is not limited to any specific type of nanofibers. Further, it should be understood that more than one type of nanofiber can be used on a particular substrate. Different nanofibers can be selected for application to different portions of the substrate. Alternatively, a mixed variety of two or more types of nanofibers can be selected for application within a single area of the substrate.

In step 104, selected areas of the substrate are identified where the nanofibers are to be applied. The purpose of identifying these selected areas is to determine which areas of the substrate must be prepared to provide an adhesion mechanism for adhering a plurality of the nanofibers to the substrate. A determination of the areas to which the nanofibers are applied will generally depend on the particular nanofiber application. For example, the selected areas can be used to form electronic circuit components such as conductive traces, antennas, electrical contacts, as well as passive and active circuit elements. Alternatively, the nanofibers can be applied in areas used to form electro-optical devices such as field emission elements. Yet another functional structure formed using the nanofibers could be an energy storage element, such as may be used for storing hydrogen and other fuels. Different types of nanofibers can be applied to selected areas to facilitate formation of the desired electronic circuit components. Alternatively, it can be advantageous in some instances to apply a mixture of nanofibers to a particular area to form the desired electronic circuit components.

An example substrate 200 is illustrated in FIG. 2 which includes a surface 203 having selected areas 201, 202 identified where nanofibers are to be adhered. It will be appreciated that the arrangement and geometry of selected areas 201, 202 shown in FIG. 2 are merely one possible example of an area where nanofibers can be applied, and the invention is not intended to be limited in this regard.

Referring again to FIG. 1, the process can continue in step 106 with the preparation of the surface of the substrate to include any layers that may need to be applied before the nanofibers are adhered to the substrate surface. This step can include application of any necessary insulating layers, metallization layers, and/or semiconductor layers on or adjacent to the selected surfaces over which the nanofibers are to be disposed. Any of a wide variety of well known processes can be used for the application of these layers. The particular technique selected for application of such layers in each case will depend on a variety of considerations, including the particular type of material forming the substrate. In FIG. 2, metalized circuit traces 204 are shown disposed on a portion of the substrate partially overlapping the selected areas 201, 202 where the nanofibers are to be adhered.

In step 108, any required ordering of the nanofibers can be identified for the purpose of the particular nanofiber article. Some nanofiber applications may not require an ordered arrangement of the nanofibers on the substrate while in other applications an ordered arrangement may be necessary. As used herein, the term ordered refers to any arrangement of nanofibers that includes a number of fibers arranged in a predetermined organized pattern. For example the fibers can be arranged so that the lengths of the fibers are generally in uniform axial alignment with one another. The particular orientation of the ordered nanofibers relative to the substrate surface on which they are adhered may also be varied for different applications and for different types of nanofibers.

Once any required ordering of the nanofibers has been identified, a suitable electric field can be provided in step 110 in preparation for dispersing the fibers on the substrate surface. The particular orientation of the electric field can be determined based on the intended orientation of the ordered nanofibers. For example, a nanofiber orientation that is generally perpendicular to a surface can be achieved by orienting an electric field so that it extends perpendicularly from the surface on which the nanofibers are to be applied. If an ordered arrangement of the nanofibers is not required, the electric field can optionally be eliminated. However, even in cases where an ordered arrangement of nanofibers is not required, the electric field can still be useful for facilitating the dispersal of nanofibers onto the substrate, as is well known in the textile flocking field.

Thereafter, the process can continue in step 112 with the preparation of selected portions of the substrate surface to provide an adhesion mechanism for securing the nanofibers to the surface. A variety of different adhesion mechanisms can be used for this purpose. For example, the adhesion mechanism can consist of a conductive or nonconductive adhesive material applied to the surface of the substrate prior to the dispersing step. Without limitation, the adhesive material can be applied as a film, spray, paste, or liquid so as to provide adhesion of the nanofibers to the selected surfaces. Any of a wide variety of commercially available adhesives can be used for this purpose, depending on the requirements of the particular application. FIG. 3 shows an adhesive material 306 disposed within each of the selected areas 201, 202.

Alternatively, the adhesion mechanism can also be a physical modification of a material forming the substrate, such as heating of a thermoplastic substrate material in selected areas to cause adhesion of the nanofibers in such areas. Selective heating techniques can be used, if necessary, to control the areas of the substrate that are heated. For example, the selected areas can be exposed to laser light or other type of photonic energy.

In yet another embodiment, the adhesion mechanism can include a combination of the foregoing techniques. For example, a material with a relatively low melting point as compared to the substrate can be applied to selected portions of the substrate. One example of such a material can be solder, although the invention is not limited in this regard. Thereafter, the relatively low melting point material can be heated so that it softens and allows adhesion of the nanofibers thereto during a nanofiber dispersion step, which shall hereinafter be described. Heating of the substrate or of the relatively low melting point material can be accomplished by conduction, induction, convection, microwave heating, exposure to laser energy, or any other suitable method.

The adhesion mechanism can be provided on selected areas of the surface so as to define one or more functional structures. Without limitation, these functional structures can include conductive traces, antennas, electrical contacts, field emission elements, electronic circuit elements, sensors, energy storage elements and so on. Conductive traces, antenna elements and electrical contacts can be formed by simply disposing conductive nanofibers on selected portions of the substrate surface to define any of a wide variety of well known geometries and structures of this type. The nanofibers can be arranged in an ordered or non-ordered way. Other passive types of circuit elements can be similarly formed. For example, resistors can be implemented by using nanofibers that provide a predetermined amount of ohmic resistance. The fibers can be disposed on the substrate surface to form a trace or path for electric current having a predetermined amount of resistance.

More complex structures are also possible. For example, in conventional field emission displays, phosphor is excited by a stream of electrons traveling through a vacuum. The display is typically matrix-addressed one row at a time using a large number of electron-emitting cathodes. These cathodes are generally positioned a fraction of a millimeter away from the phosphor screen, and the electrons are produced by cold cathode emission. It is well known in the art that nanotubes can be used to form electron-emitting cathodes for use in field emission displays. Thus, the present method can be used to dispose ordered arrangements of carbon nanotubes in selected locations that form the electron emitting cathodes of a field emission display. The precise geometry of the selected areas and the types of nanofibers necessary to implement these functional structures, as well as any circuitry needed to interface with them, can be determined based on the particular application.

In step 114, the nanofibers are dispersed on the surface of the substrate for the purpose of being adhered thereto. The nanofibers can be dispersed using any suitable means. For example, FIG. 4 is a schematic representation of an apparatus 400 that uses a conveyor 401 and an electrostatic transfer technique for dispersing nanofibers 402 onto a substrate 404. The conveyor 401 conveys the substrate 404 beneath hopper 403 that contains nanofibers 402. An electric field can be used to assist in the fiber dispersing process in a manner that is well known in the field of textile flocking.

In FIG. 4 the electric field (not shown) extends in a perpendicular direction between oppositely charged electrodes 406, 408. The field direction resulting from charged electrodes 406, 408 in this case is also perpendicular to the substrate 404. However, it should be understood that the invention is not limited in this regard.

Electrode 406 can be formed of a wire mesh for producing an electrostatic charge on the nanofibers as they pass through the electrode. Thereafter, the nanofibers can be pulled toward surface 405 of substrate 404 by oppositely charged electrode 408 as the substrate is moved under the hopper 403 by the conveyor 401. The nanofibers 402 dispersed on the substrate are caused to stand on end by the electric field and will align themselves in the field direction as shown. An adhesive mechanism, such as adhesive 410, will cause the nanofibers to adhere to the substrate 404.

The use of an electrostatic transfer as shown in FIG. 4 is advantageous in those instances where the nanofibers are to be arranged on the substrate in an ordered manner. However, in addition or as an alternative to use of the electric field, nanofibers can be dispersed onto the surface of the substrate using other means including blowers, shakers or vibration based systems, as are well known in the field of textile flocking systems. Notably, articles not requiring an ordered arrangement of nanofibers disposed on a substrate do not necessarily need to make use of electrostatic transfer techniques as described herein.

The nanofibers described herein can be mixed with any suitable dispersing agent prior to step 114 to promote dispersion. Dispersing agents can include a variety of substances such as dodecyl sodium sulfate, or other additives that promote dispersion of the nanofibers in a liquidous environment before application to the substrate. Alternatively, the fibers can be coated either through wet or dry deposition techniques to deposit organic or non-organic matter onto the nanofibers of interest to avoid coagulation/agglomeration of nanofibers. Such techniques can be necessary in some instances to separate the nanofibers and promote good uniform coverage onto the substrate of interest. These coatings on the nanofibers can be permanent, or they can be designed to be removed during a post-processing step.

Coatings on the nanofibers may also be provided for other purposes. For example, it is known in the art that bonded polymer multilayers can be applied to carbon nanotubes in a non-covalent manner. It is also known that functionalization of carbon nanotubes in this way with polymer multilayers can allow the introduction of reactive groups. These reactive groups can be used to attach biospecific ligands for applications in biosensors. Likewise, polymer multilayers can be used for the attachment of nanoparticles to nanotubes, thereby creating hybrid nanostructures. Further, the coatings on the nanotubes can also be used as spacers between the individual nanofibers. Still, it should be understood that the invention is not limited to the specific coatings described herein but instead can include any type of coating that is useful for a particular nanofiber application. These coatings on the nanofibers can be permanent, or they can be designed to be removed during a post-processing step.

The same or different types of nanofibers having different types of coatings can be dispersed on the substrate using the techniques described herein. For example, fibers with a first coating type can be applied using the foregoing technique to a first area of the substrate and fibers with a second coating type can be applied to a second area of the substrate. Alternatively, fibers of different coating types can be mixed together and applied to a single area of the substrate.

Nanofibers of different types or with different coatings can be mixed at any convenient point in time consistent with the manufacturing process. For example, separate streams of nanofibers of different types or with different coatings can be mixed during electrostatic transfer to the substrate. Alternatively, step 114 can be repeated using nanofibers of different types or with different coatings. Use of nanofibers with different coatings can be advantageous in certain instances. For example, providing mixed ordered nanofibers on a sensor can be useful to increase the sensitivity of the sensor to a broader spectrum of chemicals or biological species.

In step 116, excess nanofibers 402 that are not adhered to the substrate 404 can be removed by means of a suction column 412. The excess nanofibers 402 can be returned to the hopper 403, or they can be disposed of in a suitable manner. In step 118, the adhesion mechanism can be allowed to cure, if necessary. Cure time may vary depending on the particular adhesive or adhesion mechanism selected. The process thereafter can terminate in step 120.

It should be understood that the invention is not necessarily limited to the specific ordering of steps shown in the flowchart in FIG. 1. Instead, the ordering of steps may be modified as necessary, depending on the particular application. For example, those skilled in the art will readily appreciate that the preparation of the substrate in step 112 can occur before the electric field is applied in step 110 to produce any required ordering. Likewise, the identification of any required ordering in step 108 can be performed at any convenient time before dispersal of the nanofibers.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A method for manufacturing an ordered nanofibrous article, comprising:
   preparing a surface of a substrate to provide an adhesion mechanism for a plurality of nanofibers;
   dispersing a plurality of said nanofibers to be adhered to said surface;
   providing an electric field to selectively control an ordering of said nanofibers while said nanofibers are being dispersed onto said surface having said adhesion mechanism, wherein the electric field at least selectively controls the ordering of said nanofibers prior to said nanofibers touching said surface.

2. The method according to claim 1, further comprising selecting said nanofibers from at least one of carbon nanotubes, carbon nanohorns, alumina nanotubes, boron nitride nanotubes, carbon nanofibers, silica nanofibers, gold nanotubes, sliver nanotubes, or polymer nanotubes.

3. The method according to claim 1, further comprising selecting said nanofibers to have a fiber thickness of less than about 500 nanometers.

4. The method according to claim 1, further comprising exclusively providing said adhesion mechanism on selected areas of said surface to define an electronic circuit component, an electro-optical device, a sensor, or an energy storage element.

5. The method according to claim 1, further comprising applying a coating to said nanofibers prior to said dispersing step.

6. The method according to claim 5, further comprising removing at least a portion of said coating after said dispersing step.

7. The method according to claim 1, further comprising aligning said nanofibers in a predetermined orientation aligned with said electric field.

8. The method according to claim 1, further comprising selecting said adhesion mechanism from at least one of an adhesive material applied to said substrate or a physical modification of a material forming said substrate.

9. The method according to claim 8, further comprising selecting said physical modification to include heating said substrate.

10. The method according to claim 1, further comprising selecting a material forming said substrate to include a flexible or a conformable material.

11. The method according to claim 1, further comprising selecting said plurality of nanofibers to include a plurality of nanofibers of different types.

12. The method according to claim 11, further comprising selectively dispersing specific types of said nanofibers exclusively within selected areas of said substrate.

13. The method according to claim 11, further comprising dispersing a mixture of said nanofibers of different types within selected areas of said substrate.

14. The method according to claim 1, further comprising selecting said plurality of nanofibers to include nanofibers having different coatings.

15. The method according to claim 14, further comprising selectively dispersing said nanofibers having a particular coating exclusively within selected areas of said substrate.

16. The method according to claim 14, further comprising dispersing a mixture of said nanofibers having different coatings within selected areas of said substrate.

* * * * *